United States Patent [19]

Imura et al.

[11] Patent Number: 5,115,879
[45] Date of Patent: May 26, 1992

[54] CENTERING DEVICE FOR A SERVO VALVE OF A POWER STEERING DEVICE

[75] Inventors: Yoshihito Imura; Keita Ozeki, both of Aichi, Japan

[73] Assignee: TRW Steering & Industrial Products (Japan) 051156651, Minato, Japan

[21] Appl. No.: 626,026

[22] Filed: Dec. 12, 1990

[30] Foreign Application Priority Data

May 12, 1989 [JP] Japan ................... 1-315911

[51] Int. Cl.⁵ .............................................. B62D 5/10
[52] U.S. Cl. ..................... 180/149; 180/132; 91/375 A; 464/97
[58] Field of Search ............... 180/132, 149; 254/423; 91/375 A; 464/97, 112

[56] References Cited

U.S. PATENT DOCUMENTS

| | | | |
|---|---|---|---|
| 3,742,807 | 7/1973 | Manning | 85/5 R |
| 3,844,663 | 10/1974 | Prette | 464/112 X |
| 4,473,204 | 9/1984 | Bohm | 248/1 |
| 4,699,174 | 10/1987 | Bishop | 91/375 A X |

FOREIGN PATENT DOCUMENTS

| | | |
|---|---|---|
| 428420 | 5/1935 | United Kingdom . |
| 1530519 | 11/1978 | United Kingdom . |
| 2133104 | 7/1984 | United Kingdom . |

*Primary Examiner*—Charles A. Marmor
*Assistant Examiner*—Kevin Hurley
*Attorney, Agent, or Firm*—Tarolli, Sundheim & Covell

[57] ABSTRACT

A power steering device comprising an input shaft connected to a steering shaft, an output shaft connected to a rack for driving vehicle wheels, a servo valve including a valve sleeve surrounding the input shaft and engaging the output shaft, and a torsion bar with both ends secured to the input shaft and the output shaft. In the power steering device, the torsion bar is positioned and secured via a balance pin in the input shaft. The balance pin has multiple projecting portions arranged alternately on opposite sides of the balance pin along the length of the balance pin. After inserting the balance pin into the input shaft and the torsion bar, the input shaft and the torsion bar are relatively rotated by the protruding portions of the balance pin. The servo valve is thus correctly centered. The hydraulic pressure produced by the servo valve is balanced.

17 Claims, 4 Drawing Sheets

CENTERING DEVICE FOR A SERVO VALVE OF A POWER STEERING DEVICE

BACKGROUND OF THE INVENTION

This invention relates to a hydraulic centering device for a servo valve of a power steering device.

As shown in FIGS. 5 and 6, an input shaft 1 is joined with a torsion bar 4 via a balance pin 25 and is also joined with an output shaft 2. A valve sleeve 3 of a servo valve is rotatably inserted onto the input shaft 1 and is rotatably connected via a drive pin 5 to the output shaft 2. According to relative rotation of the input shaft 1 and the valve sleeve 3 the servo valve produces hydraulic pressure. The torsion bar 4 is secured via the balance pin 25 in the input shaft 1 such that when angle of the relative rotation is zero and the hydraulic pressure is balanced, torque of the torsion bar 4 becomes zero.

However, in this related art, once the hydraulic pressure becomes unbalanced, adjustment to balance the hydraulic pressure is impossible.

SUMMARY OF THE INVENTION

An object of the invention is to provide a device for centering a servo valve that can correct an imbalance in the hydraulic pressure.

To attain this or other object, the invention provides a power steering device comprising an input shaft connected to a steering shaft, an output shaft connected to a rack for driving vehicle wheels, a servo valve including a valve sleeve surrounding the input shaft and engaging the output shaft, and a torsion bar with both ends secured to the input shaft and the output shaft. In the power steering device, the torsion bar is positioned and secured via a balance pin in the input shaft. The balance pin has multiple projecting portions arranged alternately on opposite sides of the balance pin along the length of the balance pin.

DETAILED DESCRIPTION OF PREFERRED EMBODIMENTS

Figure 1:
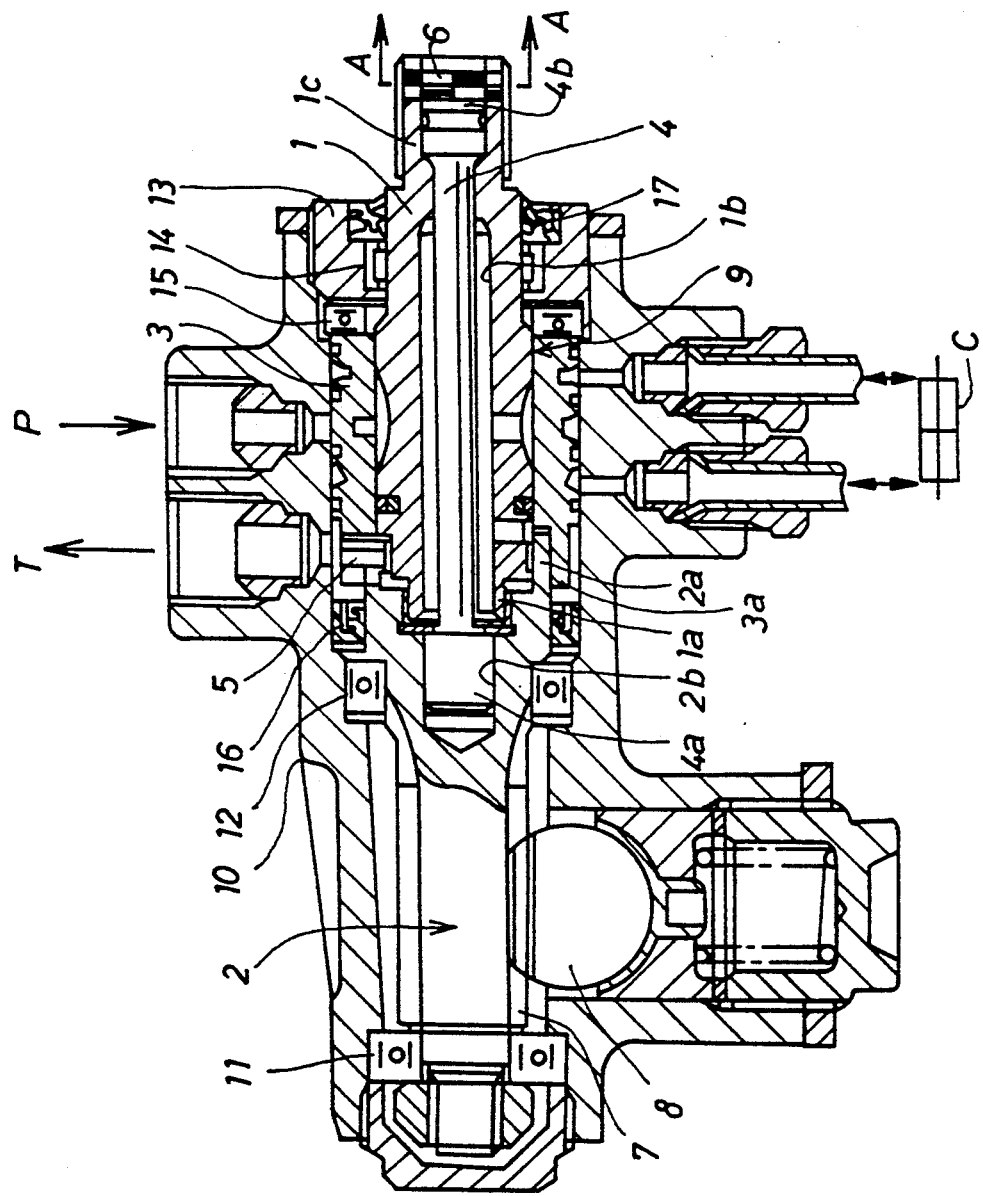
FIG. 1 is a longitudinal cross-sectional view of a power steering device embodying the invention

As shown in FIG. 1, an end 1a of the input shaft 1 concentrically engages a cylindrical portion 2a of the output shaft 2. The torsion bar 4 extends through a hole 1b in the input shaft 1 and has the same axis as the input shaft 1. One end 4a of the torsion bar 4 is pressed into a hole 2b formed along the axis of the output shaft 2. The other end 4b of the torsion bar 4 is inserted in a hole in an external end 1c of the input shaft 1 and secured via a balance pin 6 (described later) in the input shaft 1. The input shaft 1 and the output shaft 2 relatively rotate in a range defined by the torsion bar 4.

The input shaft 1 is connected to a steering shaft (not shown). The output shaft 2 has on its end a known pinion 7 which meshes with a known rack 8 for driving vehicle wheels (not shown).

The valve sleeve 3 rotatably surrounds the input shaft 1 and composes a servo valve 9 of rotary type. An end 3a of the valve sleeve 3 is inserted onto the cylindrical portion 2a of the output shaft 2. A hole formed in the end 3a of the valve sleeve 3 receives the drive pin 5 extending perpendicularly from an axial center of the output shaft 2.

The input shaft 1, the output shaft 2, and the valve sleeve 3 are contained in a housing 10 and are rotatably supported by bearings 11, 12, and a bearing 14 formed in a plug 13 engaging in an opening of the housing 10. A thrust bearing 15 is interposed between the plug 13 and the valve sleeve 3. Oil seals 16 and 17 are provided on the periphery of the output shaft 2 and the input shaft 1, respectively, for sealing opposite sides of the servo valve 9.

When the servo valve 9 is in neutral condition, oil discharged from a pump P is circulated to a tank T. When the input shaft 1 and the output shaft 2 relatively rotate, the input shaft 1 and the valve sleeve 3 relatively rotate, thereby controlling supply and discharge of compressed oil into and from either chamber of a power cylinder C. Subsequently, the rack 8 is axially moved, and the output shaft 2 is rotated until the relative rotation angle between the input shaft 1 and the output shaft 2 becomes zero.

Figure 3:
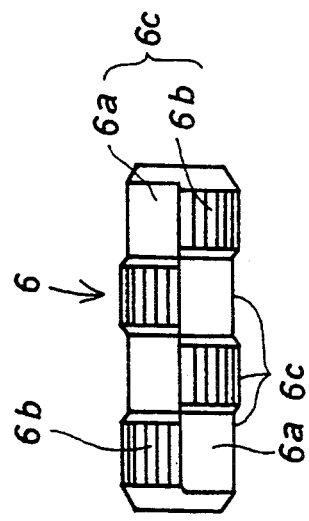
FIG. 3 is a front view of a balance pin for a first embodiment.
Figure 4:
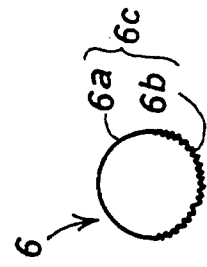
FIG. 4 is a side view of a module of the balance pin in FIG. 3.
Figure 5:
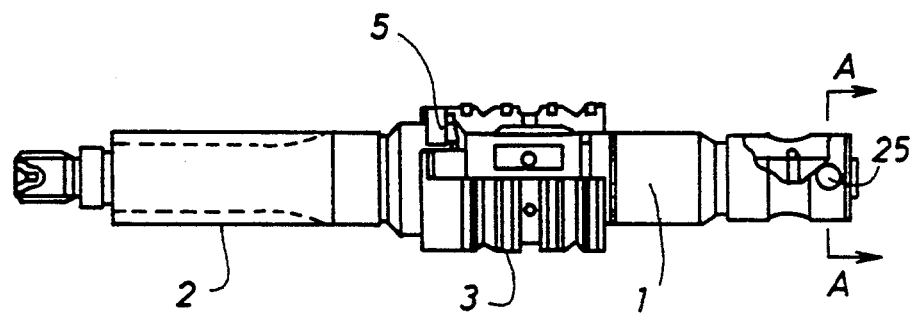
FIG. 5 is a front view of a power steering device using a related-art balance pin.
Figure 6:
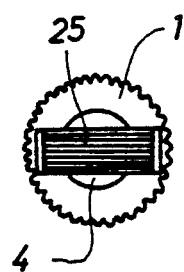
FIG. 6 is a cross-sectional view taken along line A—A in FIG. 5.

After the power steering device is assembled, if hydraulic pressure is unbalanced, the position of the servo valve 9 is corrected by relocating the balance pin 6. As shown in FIGS. 3 and 4, the balance pin 6 comprises four modules 6c along the axis of the balance pin 6. Each module 6c has a basically circular cross-section. Further, each module 6c comprises two half-cylindrical sections 6a and 6b. Smooth section 6a has a smooth surface, while serrated section 6b has a serrated surface. Serrated section 6b has a larger effective diameter than smooth section 6a. The serrated section 6b is arranged on the side of the balance pin 6 opposite to each adjoining serrated section 6b.

Figure 2:
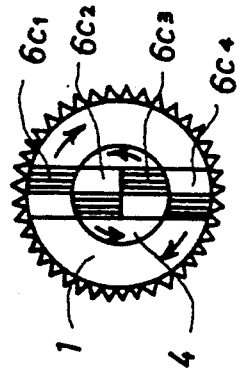
FIG. 2 is a cross-sectional view taken along line A—A in FIG. 1.

After the balance pin 6 is inserted in a hole to join the input shaft 1 and the torsion bar 4, as shown in FIG. 2, the serrated surfaces of module $6c_1$ and module $6c_4$ rotate the input shaft 1 clockwise. The serrated surface of module $6c_2$ and module $6c_3$ in the torsion bar 4 rotate the torsion bar 4 counterclockwise. The serrated sections 6b have larger diameter than the smooth sections 6a. Since the torsion bar 4 is connected to the output shaft 2, output shaft 2 rotates, and the valve sleeve 3 rotates relative to the input shaft 1, thereby relatively positioning the input shaft 1, the output shaft 2, the torsion bar 4, and the servo valve 9. The hydraulic pressure produced by the servo valve 9 is thus balanced. If the hydraulic pressure deviates or becomes unbalanced, a rotation angle of the balance pin 6 relative to a standard line on the input shaft 1 is determined based on deviation amount and direction of the hydraulic pressure, prior to the inserting of the balance pin 6 into the input shaft 1 and the torsion bar 4. The deviation in the hydraulic pressure can thus be easily corrected by rotating the balance pin 6 the rotation angle away from the standard line.

Figure 7:
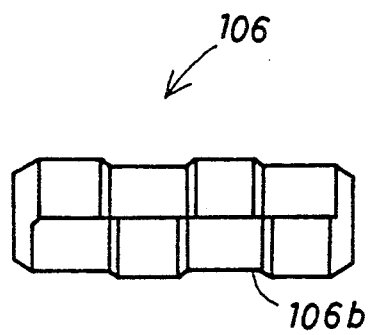
FIG. 7 is a front view of a balance pin for a second embodiment.
Figure 8:
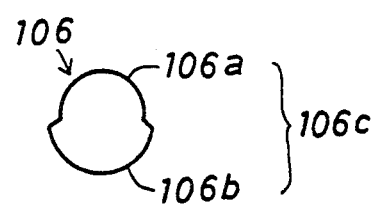
FIG. 8 is a side view of a module of the balance pin in FIG. 7.

As shown in FIGS. 7 and 8, in a second embodiment, a balance pin 106 comprises a protruding section 106b instead of the serrated section 6b of the first embodiment. The protruding section 106b and a smooth section 106a comprise each module 106c of the balance pin 106. The balance pin 106 functions in the same way as the balance pin 6 of the first embodiment.

From the above description of a preferred embodiment of the invention, those skilled in the art will perceive improvements, changes, and modifications. Such improvements, changes and modifications within the skill of the art are intended to be covered by the appended claims.

What is claimed is:

1. A balance pin for connecting an input shaft of a power steering device to a torsion bar of the power steering device, comprising:
   a cylindrical solid;
   a plurality first sections having a first effective diameter formed on the surface of the cylindrical solid, where each first section is formed entirely on one side of an axial plane including an axis of the cylinder;
   a plurality of second sections having a second effective diameter formed on the surface of the cylindrical solid; wherein
   the first effective diameter is greater than the second effective diameter;
   each second section corresponds to one first section;
   the second sections are located on a side of the axial plane opposite to the side of the axial plane on which corresponding first sections are formed; and
   no first section is adjacent to another first section along the cylinder axis.

2. The balance pin of claim 1, in which four first sections and four second sections are formed on the cylindrical solid.

3. The balance pin of claim 1, in which:
   the second sections have a smooth surface; and
   the first sections comprise a plurality of ridges radially extending from the outer surfaces of the cylindrical solid, the ridges being formed parallel to the cylinder axis.

4. The balance pin of claim 1, in which:
   the second sections have a smooth surface; and
   the first sections comprise a raised portion on the outer surface of the cylindrical solid, where the raised portion is formed parallel to the cylinder axis.

5. A balance pin for connecting an input shaft of a steering device to a torsion bar of the steering device, said balance pin comprising:
   a cylindrical solid;
   a plurality of projecting sections alternately arranged on opposite sides of said cylindrical solid along said cylindrical solid; and
   a plurality of smooth sections alternately arranged on opposite sides of said cylindrical solid between said projecting sections,
   said plurality of projecting sections including four projecting sections formed on said cylindrical solid and said plurality of smooth sections including four smooth sections formed on said cylindrical solid.

6. The balance pin of claim 5, an effective diameter of said projecting sections being greater than an effective diameter of said smooth sections.

7. A balance pin for connecting an input shaft of a steering device to a torsion bar of the steering device, said balance pin comprising:
   a cylindrical solid; and
   a plurality of projecting sections alternately arranged on opposite sides of said cylindrical solid along said cylindrical solid, said projecting sections including a plurality of ridges radially extending from the outer surfaces of said cylindrical solid, said ridges being formed parallel to an axis of said cylindrical solid.

8. The balance pin of claim 7, including a plurality of smooth sections alternately arranged on opposite sides of said cylindrical solid between said projecting sections.

9. A balance pin for connecting an input shaft of a steering device to a torsion bar of the steering device, said balance pin comprising:
   a cylindrical solid; and
   a plurality of projecting sections alternately arranged on opposite sides of said cylindrical solid along said cylindrical solid, said projecting sections including raised portions on the outer surface of said cylindrical solid, said raised portions being formed along said cylindrical solid parallel to an axis of said cylindrical solid.

10. A steering device for a vehicle, said steering device comprising:
   an input shaft for connection with a steering shaft of the vehicle;
   an output shaft for connection with a rack and pinion connected with steerable wheels of the vehicle;
   a torsion bar, a first end of said torsion bar being concentrically located within a portion of said input shaft and a second end of said torsion bar being secured to said output shaft; and
   a balance pin for securing said first end of said torsion bar to said input shaft;
   said balance pin including a plurality of projecting sections alternately arranged on opposite sides of said balance pin along the length of said balance pin and a plurality of smooth sections alternately arranged on opposite sides of said balance pin between said projecting sections;
   said plurality of projections sections including four projecting sections formed on said balance pin, said plurality of smooth sections including four smooth sections formed on said balance pin;
   said pluralities of projecting and smooth sections defining two end pairs of sections each including a projecting section and an opposing smooth section, one end pair being formed on each end of said balance pin;
   said pluralities of projecting and smooth sections defining two middle pairs of sections each including a projecting section and an opposing smooth section, said middle pairs being formed between said two end pairs;
   said two end pairs being engagable with spaced surfaces of the input shaft;
   said two middle pairs being engagable with a surface of the torsion bar.

11. The power steering device of claim 10, wherein upon axial rotation of said balance pin said projecting sections of said two end pairs contact said input shaft and said projecting sections of said two middle pairs contact said torsion bar to axially rotate said input shaft and said torsion bar relative to each other.

12. A steering device for a vehicle, said steering device comprising:
- an input shaft for connection with a steering shaft of the vehicle;
- an output shaft for connection with a rack and pinion connected with steerable wheels of the vehicle;
- a torsion bar, a first end of said torsion bar being concentrically located within a portion of said input shaft and a second end of said torsion bar being secured to said output shaft; and
- a balance pin for securing said first end of said torsion bar to said input shaft, said balance pin including a plurality of projecting sections alternately arranged on opposite sides of said balance pin, said projecting sections including a plurality of ridges radially extending from the outer surface of said balance pin.

13. The steering device of claim 12, wherein upon axial rotation of said balance pin said projecting sections of said balance pin contact said input shaft and said torsion bar to axially rotate said input shaft and said torsion bar relative to each other.

14. The power steering device of claim 12, said balance pin protruding through a first hole in said input shaft, a hole in said torsion bar, and a second hole in said input shaft.

15. A steering device for a vehicle, said steering device comprising:
- an input shaft for connection with a steering shaft of the vehicle;
- an output shaft for connection with a rack and pinion connected with steering wheels of the vehicle;
- a torsion bar, a first end of said torsion bar being concentrically located within a portion of said input shaft and a second end of said torsion bar being secured to said output shaft; and
- a balance pin for securing said first end of said torsion bar to said input shaft, said balance pin including a plurality of projecting sections alternately arranged on opposite sides of said balance pin along the length of said balance pin, said projecting sections including a raised portion on the outer surface of said balance pin.

16. The power steering device of claim 15, said balance pin including a plurality of smooth sections alternately arranged on opposite sides of said balance pin between said projecting sections.

17. The power steering device of claim 16, an effective diameter of said projecting sections being greater than an effective diameter of said smooth sections.

* * * * *